Patented Jan. 4, 1927.

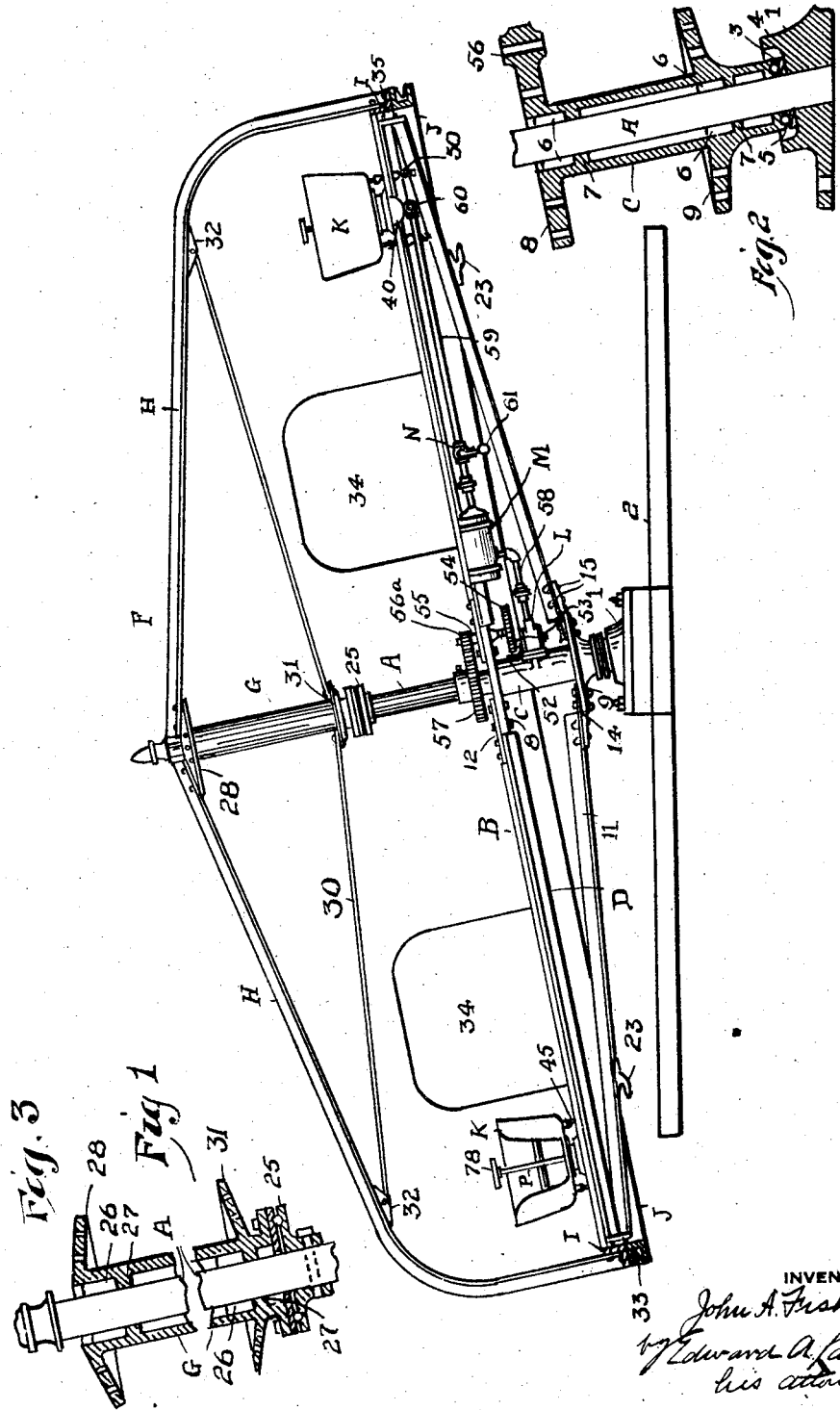

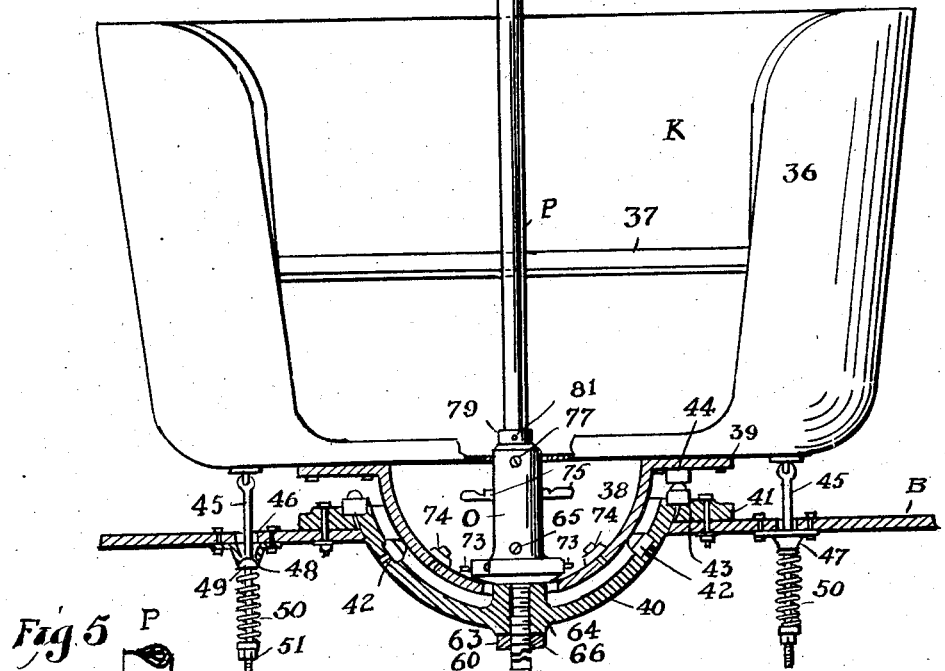
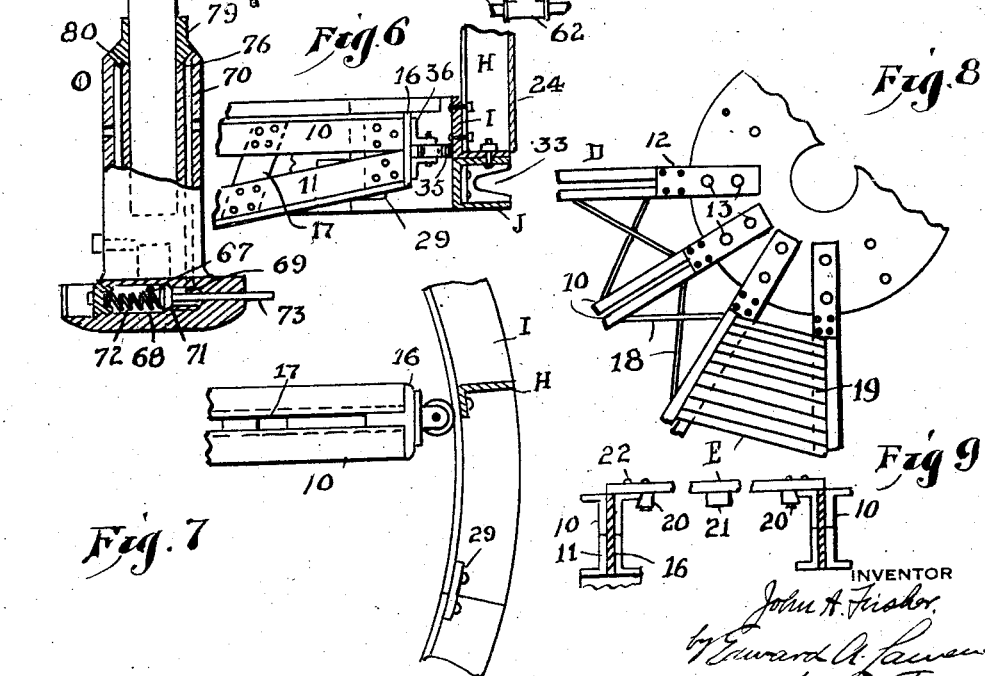

1,612,970

UNITED STATES PATENT OFFICE.

JOHN A. FISHER, OF SANDUSKY, OHIO.

AMUSEMENT DEVICE.

Application filed November 21, 1923. Serial No. 676,025.

My invention consists in certain new and useful improvements in passenger carrying amusement devices characterized by a moving platform or support with a passenger car or cars mounted thereon.

One of the features of my present invention comprises a rotating platform or turn table mounted on an axis inclined from the vertical, and having mounted thereon one or more passenger cars which are preferably capable of movement independent of or distinctive from the movement of the platform, so that the rotation of the inclined platform will tend to cause independent movements of the car or cars; and means are also preferably provided whereby the passenger may voluntarily augment or resist the movement of the car induced by the rotation of the platform, or may at will cause such movements regardless of the movement of the platform.

Another feature of my present invention is the provision of a passenger car capable of movement in all directions about a center of oscillation, comparable to that in a ball and socket joint, and mounted on a moving platform or support, preferably a platform rotating in a plane angular to the horizontal. Thus as the platform rotates, the car is caused to gyrate or rock and turn in various directions, as it is acted upon by the centrifugal and gravitational forces incident to the movement of the platform, such, for instance, as the rotation of an inclined platform as above described.

The independent movement of the car is effected and governed by the speed at which the platform is moving and also by the more or less abrupt changes of speed or the stopping or starting of the platform.

The center of movement of the car may be above or below the floor of the car, but said center is preferably below the floor, giving a greater radius of movement to be enjoyed by the occupants of the car.

To enable a passenger to steady himself in the moving car, and also to enable him to either augment or resist the movements of the car induced by the movements of the platform, and to enable him to voluntarily impart movements to the car irrespective of those of the platform, I provide means fixed relative to the platform and which may be grasped by the passenger. Thus I may provide the car with a steadying post which bears a fixed relation to the platform and which is provided with a convenient hand hold whereby the passenger may steady himself and also control the movements of the car.

Means, preferably in the form of cams, are provided for varying or modifying in certain directions the inclinations or gyrations of the car. Thus the passenger, by using the steadying post, may actuate or move the car, so as to cause certain of said means or cams to engage, thus increasing or decreasing the inclination or amplitude of motion of the car, as may be desired.

Resilient means are provided for modifying the movements of the car; for limiting its gyrations or oscillations; for absorbing severe shocks and jolts, and also for normally maintaining the car in its position of rest when the platform is stationary.

I provide means for delivering blasts or jets of compressed air to the interior of the car body and preferably from an orifice adjacent to the car floor; also means for operating instrumentalities for producing incongruous and amusing sounds. Such blast and sound producing means are preferably constructed so as to function automatically when the car assumes certain positions. The purpose of the air blast and sounds is to surprise, startle and amuse the passengers. Patrons who have observed that the sounds or blasts are produced when the car assumes certain positions are interested in producing or avoiding the production of the same, and this may be accomplished by the use of the steadying post above mentioned.

It is preferable to differentiate the cars from each other in respect to the production of the air blasts and sounds, and also in respect to the disposition of the cam means, so that the patrons may find diversified amusement in occupying the various cars.

In order to prevent the sound and blast producing mechanism from operating while patrons are entering or alighting from the cars and while the amusement device is stationary, I provide an automatic means, such as a centrifugal valve, for cutting off the air until the amusement device is put in motion.

To protect the platform and cars from unfavorable weather and to contribute to the comfort of passengers, I provide a top enclosure therefor which is preferably in the form of a dome-like top provided with side openings for the ingress and egress of patrons.

This top may be stationary, but it is preferably rotated either in the same direction or in the opposite direction to the rotation of the platform, and, if preferred, at different speeds.

Thus, if the top be stationary or rotated in the opposite direction to the rotation of the platform, the result of the cars passing the openings in the top is the exposure to the passengers of views of the surrounding scenery, the view point of the passenger being continuously changed as the ride progresses. Thus, a rapid, and if desired, irregular succession of views is produced in which no two distinctive views reoccur in sequence to determine the distance traversed or the speed of travel. Consequently, the impression is produced that a landscape of great extent is being viewed, and the speed of travel is apparently enhanced.

My invention particularly lends itself to portable construction, so that it may be readily taken down and put up in temporary positions. It is thus particularly applicable to carnival and traveling show use.

Other novel features of construction and also of arrangement of parts will appear from the following description.

In the accompanying drawings which however are merely intended to illustrate a preferred embodiment of the principles of my present invention without limiting the scope of the latter to the construction shown, Fig. 1 is a diametric section of a rotary passenger carrying amusement device embodying the principles of my invention, all but two of the passenger cars being omitted for the sake of clearness; Fig. 2 is an enlarged section in detail showing the center post and hub structure by means of which the platform is rotatably mounted; Fig. 3 is an enlarged section in detail showing the method of mounting the sleeve which carries the dome like top on the center post; Fig. 4 is an enlarged side view of one of the passenger cars, its mounting on the platform being shown in section; Fig. 5 is an enlarged sectional detail showing the automatic blast and sound producing mechanism; Fig. 6 is an enlarged detail of a portion of the structure shown in Fig. 1, illustrating the relation of the rotating platform to dome like top; Fig. 7 is a plan view of the same; Fig. 8 is a broken plan view showing in detail a portion of the platform structure, and Fig. 9 is an elevation showing in detail the method of mounting the floor sections of the platform.

The following is a detailed description of the invention.

A represents the center post which forms the axis about which the rotary platform B revolves, said post being tilted or inclined more or less from the vertical so that the plane of the rotating platform, while normal to the center post, is disposed angularly to the horizontal.

The center post is preferably of steel and circular in form. I provide a firm fixture or foundation for the post so that it will be able to sustain the rotating carrier without wobbling.

Thus where the amusement device is to be erected on a permanent site, the post may be cemented in a hole in the ground or fixed in any convenient form of permanent foundation. But where, as is very frequently the case, the amusement device is to be portable, so as to be erected for relatively short stays at different sites, I prefer to fix the lower end of the post in a base casting 1, which is bolted or otherwise secured to a relatively wide extending but portable base platform 2 which may be of any convenient construction, as for instance formed of wooden framing. The top of the base is provided with a thrust bearing surface 3 in a plane normal to the axis of the post, and which bearing surface is preferably surrounded by an edge flange 4 which acts to prevent the escape of lubricant.

5 represents an anti-friction or ball-bearing device resting on the bearing surface 3 and concentric with the center post A. The rotary platform B may be of any convenient construction, preferably formed so as to enable it to be readily taken apart and assembled. In the drawings the said platform is shown as of the following construction. C is a hub member which is rotatably mounted on the lower portion of the center post A, the lower end of said hub resting on the anti-friction bearing 5, roller bearings or other anti-friction devices 6 held in place by internal shoulders 7 on the hub being interposed between the center post and the hub. The hub is provided with an upper circumferential flange 8 in a plane normal to the axis of the hub and a lower circumferential flange 9 which flares upwardly.

The platform is supported from the hub by means of a plurality of radially disposed arms D and which may be of any convenient character but are preferably of the following construction. Thus each of said arms is formed of a pair of steel joist 10 whose inner ends are secured to the top flange 8 of the hub C, and a pair of struts 11 having their inner ends attached to the lower flange 9 of the hub C and their outer ends attached to the outer ends of the joist 10. Said joist and struts are conveniently formed of angle irons. The joist have their horizontal flanges uppermost and turned outwardly, while the struts have their horizontal flanges beneath and also turned outwardly. 12 represents tie plates which are riveted or otherwise attached to the inner ends of the pair of joist and which are detachably secured to the upper flange 8 as by bolts 13. The inner ends of the joist 11 are similarly attached to the lower flange 9 by the tie plates 14 and bolts 15. The outer ends of the joist and the struts are rigidly connected together by means of the T-irons 16 whose stems are inserted between the pairs of joist and struts and secured by rivets. The joist and struts may be braced together intermediate of their ends by one or more web braces 17 whose ends are inserted between the pairs of joist and of struts and are riveted in place. It is evident that each of the radial arms is a unitary or truss structure which may be mounted on or dismounted from the hub. When the several arms D are mounted on the hub they may be tied together and braced as by means of the connecting tie rods 18.

The platform may be floored in any convenient manner. I prefer to provide a sectional floor which may be readily taken up and put down, and for this purpose I provide segmental shaped floor sections E which are formed of slats 19 nailed or otherwise attached to the side stringers 20 and an intermediate stringer 21. Additional bracing may be provided to add strength and rigidity to the floor sections. The side stringers 20 converge inwardly and match the angularity of the arms D, and said stringers have their outer faces beveled so as to engage by wedge action the flanges of the joist 10 of adjacent arms D. Thus the floor sections may be slid into place after the arms are mounted on the hub.

Tie bolts 22 may be inserted through holes in the floor sections and in the flanges of the joist 10, thereby preventing accidental movement of the sections. By removing these bolts the sections may be pulled out from between the arms.

Any convenient means for rotating the platform B on its inclined axis may be provided. Thus I have shown sheave blocks 23 attached to the under side of each of the arms D at equal distances from the hub, which sheave blocks may be engaged by a cable wound about a power drum or other tractive device.

I provide a suitable top F for the platform. If desired a canopy top may be used; and the same may be stationary. However, I prefer to provide a dome-like top enclosing the platform, and to provide means for rotating the same either in the same direction in which the platform is rotated, or as is preferable, in the opposite direction.

Said top preferably consists of duck or canvas 24 stretched over a frame work which is rotatably mounted on the center post A. The hub of the top F may consist of a sleeve G rotatably mounted on the center post A with its lower end resting on the thrust bearing 25 supported on said post. 26 represents roller bearings interposed between the post and the sleeve and supported by internal ribs 27 on the sleeve.

H represents a plurality of ribs, preferably angle irons, whose upper or inner ends are bolted or otherwise detachably secured to the top flange 28 of the sleeve G, while the outer and lower ends of said ribs are detachably bolted to the sectional ring I formed of angle iron with its horizontal flange below. To the under side of the ring I is attached a second ring J formed of channel iron with its trough disposed outwardly. Said rings are preferably formed in segmental sections which are detachably connected together by the tie plates 29, so that the rings may be assembled or dis-assembled to render the device portable. The ribs are braced by means of the struts 30 whose inner ends are detachably connected to the lower flange 31 of the sleeve G, and whose outer ends are detachably connected to the ribs as shown at 32. The dome-like character of the top is obtained by giving the inner and upper portions of the ribs H a moderate angle of inclination while the outer and lower portions of the ribs are turned downwardly at a sharp angle as shown in Fig. 1.

Convenient means may be provided for rotating the top in either direction. Thus I have shown the sheave blocks 33 attached to the lower ring J so that an endless cable may be run around the said ring and wound on a power driven drum.

The top F is provided at convenient intervals with openings or doorways 34 for the ingress and egress of patrons.

The ends of the platform-supporting arms D are provided with rollers 35, mounted in brackets 36 secured to the T irons and journaled on vertical axes, and which bear against the inner surface of the metal ring I, thus steadying the frame of the top F and preventing side sway of the same and friction between the same and the platform when there is relative movement between the two.

K represents the passenger cars, any convenient number of which are mounted on the platform B, and of which two only are shown in Fig. 1 for the sake of clearness.

In connection with a platform rotating on a tilted axis I may use any form of passenger car, including passenger cars generally capable of independent movement relative to the rotating platform.

However, I have invented a new and improved type of such car which may be advantageously used not only in connection with the inclined platform shown, but in connection with any moving support. One of said cars is shown on enlarged scale in Fig. 4 and the same is provided with a suitable shaped body 36 which may be of metal and wood and preferably suitably upholstered.

37 is a seat for said car. The body of the car is provided with a suitable opening at one side for the ingress and egress of passengers. The car is mounted on the platform in such a manner that it is capable of movement relative to the platform in all directions about a given center. The action is similar to that of a ball and socket joint.

Thus 38 is a spherical male bearing member of substantially bowl shape provided with a top flange 39 by means of which the bearing member is attached to the bottom of the car. 40 is a female bearing member of complementary shape which depends through an opening in the platform and is secured to the same by means of its top flange 41. 42 represents three or more ball casters which are mounted on the interior surface of the bearing member 40 and arranged in annular series around the same to form anti-friction supports for the male bearing member 38 so that the male member will gyrate freely in the female member. The top flange 41 of the female bearing member 40 is also provided with a series of ball casters 43 which provide for anti-friction engagement with the flange 39 of the male bearing member 38 upon violent or extended lateral movements of the car body.

44 represents one or more cams fixed to the under side of the flange member 39 and adapted upon the proper movement of the car to be engaged by one or more of the ball casters 43, thus abruptly changing the movement of the car. By placing the cams 44 in different positions in different cars an element of surprise and novelty is provided so that patrons can find increased amusement in trying different cars to enjoy different motions.

I provide means for limiting the gyrations of the car on its bearing, for absorbing shocks, and for maintaining the car in its normal position when at rest.

Thus, 45 represents eye-bolts which are loosely attached to the under surface of the car and depend through loosely fitting holes 46 in the floor of the platform B and also through inverted cone-shaped fittings 47 secured to the under side of the platform and provided at their lower ends with the concaved bearing surfaces 48 concentric with the axis of the fittings. 49 are hemi-spherical collars slidingly mounted on the bolts 45 and engaging the bearings 48 from below, being held in resilient contact therewith by the helical springs 50 coiled about said bolts and held in position by the nuts 51 screwed into the lower end of said bolts.

The holes in the platform and the bores in the fittings are of sufficient size to permit the eye-bolts to assume as great an angle with respect to the car as the compression of the helical springs will permit. The compression of the springs may be regulated to any desired strength by means of the nuts 51.

Three or more of such resilient devices, spaced at equal distance apart, are provided.

It is evident that the gyrations and movements of the car are thus resiliently limited and cushioned, and that the car when coming to rest will automatically assume, and while at rest will maintain, its normal position relative to the platform which is shown in Figs. 1 and 4.

If desired the center of movement of the car may be within the same, but by lowering said center the radius of movement is lengthened and the movements thereby accentuated.

I provide means for supplying compressed air to the cars for the production of air blasts and sound production.

I prefer to supply the necessary compressed air by means operated by the rotation of the platform or other moving part of the amusement device.

Thus I have shown a rotary pump L mounted on the hub C and having its vertically disposed driven shaft 52 provided with a pinion 53 meshing with the larger gear 54 on the lower end of a vertically disposed shaft 55 which is journaled in a sleeve bearing 56 on the top flange 8 of the hub C. The upper end of the shaft 55 is provided with a pinion 56ª meshing with a fixed gear 57 mounted concentrically on the center post A. Thus the rotation of the platform B operates the pump L and the greater the speed of the platform, the greater the air pressure delivered by the pump. The discharge of the pump is connected by a pipe 58 to the storage tank M and said tank M is connected by a pipe 59 to the circular manifold pipe 60 secured to the under side of the floor of the platform B and extending under the positions of the cars K. The pipe 59 is provided with an automatic, centrifugally opened valve N, having a weighted valve lever 61 which, when the platform B is at rest, hangs vertically to close the valve, but which valve, when the platform is in motion, is opened by the inertia of the weighted lever acting in opposition to the forces of rotation. Thus as the platform starts revolving the valve is opened, supplying compressed air to the manifold 60, but as the platform slows down and stops the valve is automatically closed. Under each of the cars K the manifold 60 is provided with a T-fitting 62 whose stem extends upwardly and is screwed into the stem or lower end of a blast pipe 63 which extends up through the bore of the central boss 64 of the female bearing member 40 and has a drive fit in the lower bore of a vertically disposed casting O. A set screw 65 may be inserted through a threaded hole in the casting to clamp the latter and the pipe 63 into relationship. A nut 66 may be screwed up on the pipe 63 against the lower end of the boss 64 to hold the parts rigidly together.

The upper end of the pipe 63 within the bore of the casting O is closed and said pipe is provided with ports which register with ports 67 in the casting leading into the larger diameters of the differential valve chambers 68 formed in the laterally extended base of the casting O. The smaller diameters of said valve chambers are provided with ports 69 connecting with the vertically disposed escape passages 70 in the casting.

71 represents poppet valves which are introduced into the valve chambers through their removable screw plug ends and 72 represents helical springs which normally hold said poppet valves intermediate of the ports 67 and 69. The stems 73 of said valves protrude through holes in the outer ends of the chamber. The poppet valves are normally held intermediate of the ports 67 and 69 to cut off the compressed air from the passages 70 but when the car bodies swing or gyrate in the proper directions the protruding stems 73 of the poppet valves come into contact with projections or abutments 74 on the inner surface of the male bearing member 38, thereby pushing inwardly said valve stems and retreating the poppet valves until communication is established between the ports 67 and 69, thus admitting blasts of compressed air to the passages 70, which blasts are cut off when the valve stems are moved out of engagement with said projections, allowing the valves to spring closed.

75 are air operated whistles or other sound producing devices screwed into holes in the sides of the casting O which holes communicate with the vertical passages 70 so that when compressed air is admitted to the said passages sounds are produced. The upper ends of the passages 70 communicate with a conical seat 76 in the upper end of the casting O.

P is the steadying post whose lower end has a drive fit in the upper bore of the casting O and a set screw 77 may be provided to hold said post rigidly in position. The upper end of the steadying post is provided with a hand hold 78, which may be in the form of a hand wheel, to be grasped by the passenger or passengers.

79 is a collar slidably mounted on the post P and provided with a conical under face adapted to fit into the conical seat 76 in the upper end of the casting O. The lower face of the collar 79 is provided with radial channels 80 which form outlet passages for the vertical passages 70. By turning or otherwise adjusting the collar 79 the volume of the blast delivered from the upper ends of the passages 70 into the interior of the car may be regulated. 81 is a set screw for fixing the collar 80 in any adjustable position.

It is evident that when the car assumes certain predetermined positions relative to the platform blasts of air will be delivered to the interior of the car and sharp and startling sounds will be produced for the entertainment of the patrons. It is further evident that by grasping the wheel 78 a passenger may impart motion to the car or may augment or alter the motion imparted to the car by the independent movements thereof. Thus the passenger may learn to cause the air blasts to be delivered and the whistles to be sounded at will, or he may impart independent movements to the car.

As an additional feature of novelty, I prefer to differentiate the cars as to the movement thereof required to cause the production of air blasts and sounds so that the patrons may be amused by trying different cars and experimenting therewith to produce these features of novelty.

Although, for the purpose of clearly illustrating the principles of my invention, I have described in detail the embodiment thereof shown in the drawings, I do not wish to limit myself thereby, but claim broadly:—

1. In an amusement device, the combination of a support, a passenger car mounted on said support and capable of independent movements relative thereto, means for discharging blasts of air into the interior of said car, and valvular means actuated by the movements of said car controlling the said blasts.

2. In an amusement device, the combination of a support, a passenger car mounted on said support and capable of independent movement relative thereto, compressed air connections for admitting blasts into the interior of the car, and a valvular means intermittently actuated by the movements of the car controlling said connections.

3. In an amusement device, the combination of a support, a car mounted on said support and capable of independent movements relative thereto, an air actuated sound producing device associated with said car, valvular means for the supply of compressed air to said device, and means whereby said valvular means are intermittently actuated by the movement of said car.

4. In an amusement device, the combination of a rotary platform, an air compressor mounted on said platform and operated by the rotation of the same, a passenger car mounted on said platform and independently movable in relation thereto, a compressed air delivery pipe connecting said compressor with said car, and means operated by the independent movement of said car for controlling the discharge of compressed air from said pipe.

Signed at Sandusky, Ohio, this 7th day of Nov., 1923.

JOHN A. FISHER.